United States Patent [19]

Van Wicklin, Jr.

[11] 3,836,204
[45] Sept. 17, 1974

[54] BRAKE SYSTEM PROPORTIONING VALVE
[75] Inventor: Warren A. Van Wicklin, Jr., Dearborn, Mich.
[73] Assignee: Ford Motor Company, Dearborn, Mich.
[22] Filed: July 17, 1972
[21] Appl. No.: 272,506

[52] U.S. Cl............. 303/6 C, 137/493, 188/349, 303/84 A, 340/52 C
[51] Int. Cl............................................. B60t 11/34
[58] Field of Search........ 303/6 C, 6 R, 84 A, 84 R; 188/151 A, 151 R, 152, 349; 200/82 D; 340/52 C; 60/54.5 E; 137/508, 493

[56] References Cited
UNITED STATES PATENTS
3,173,264 3/1965 Hazeltine............................ 303/6 C Primary Examiner—Duane A. Reger
Assistant Examiner—D. C. Butler
Attorney, Agent, or Firm—Joseph W. Malleck; Keith L. Zerschling; Clifford L. Sadler

[57] ABSTRACT

A vehicular braking system having fluid proportioning means between front and rear braking elements effective to maintain rear braking pressure substantially at master cylinder pressure while intensifying the front braking pressure at a multiple thereof above a changeover pressure point.

2 Claims, 11 Drawing Figures

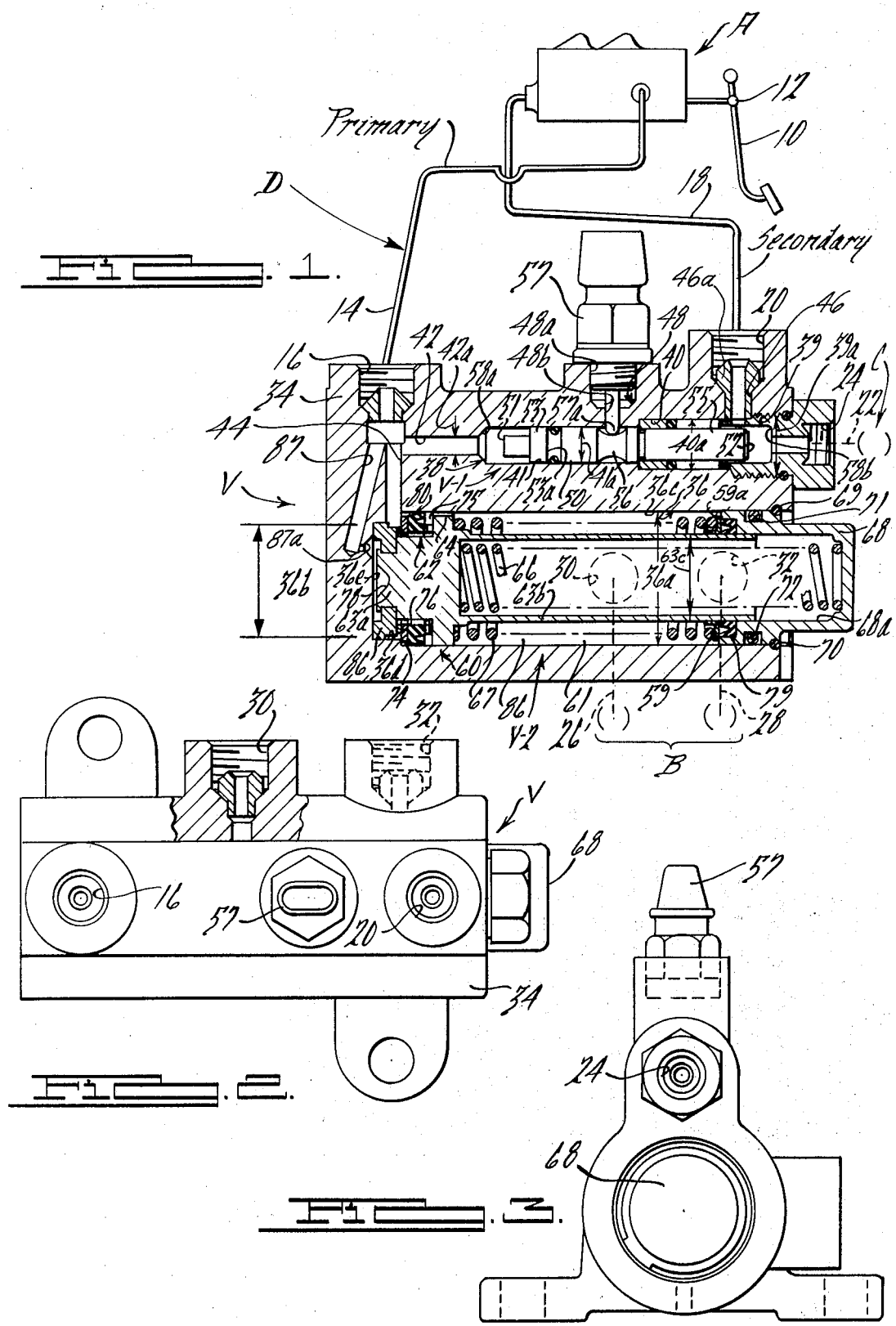

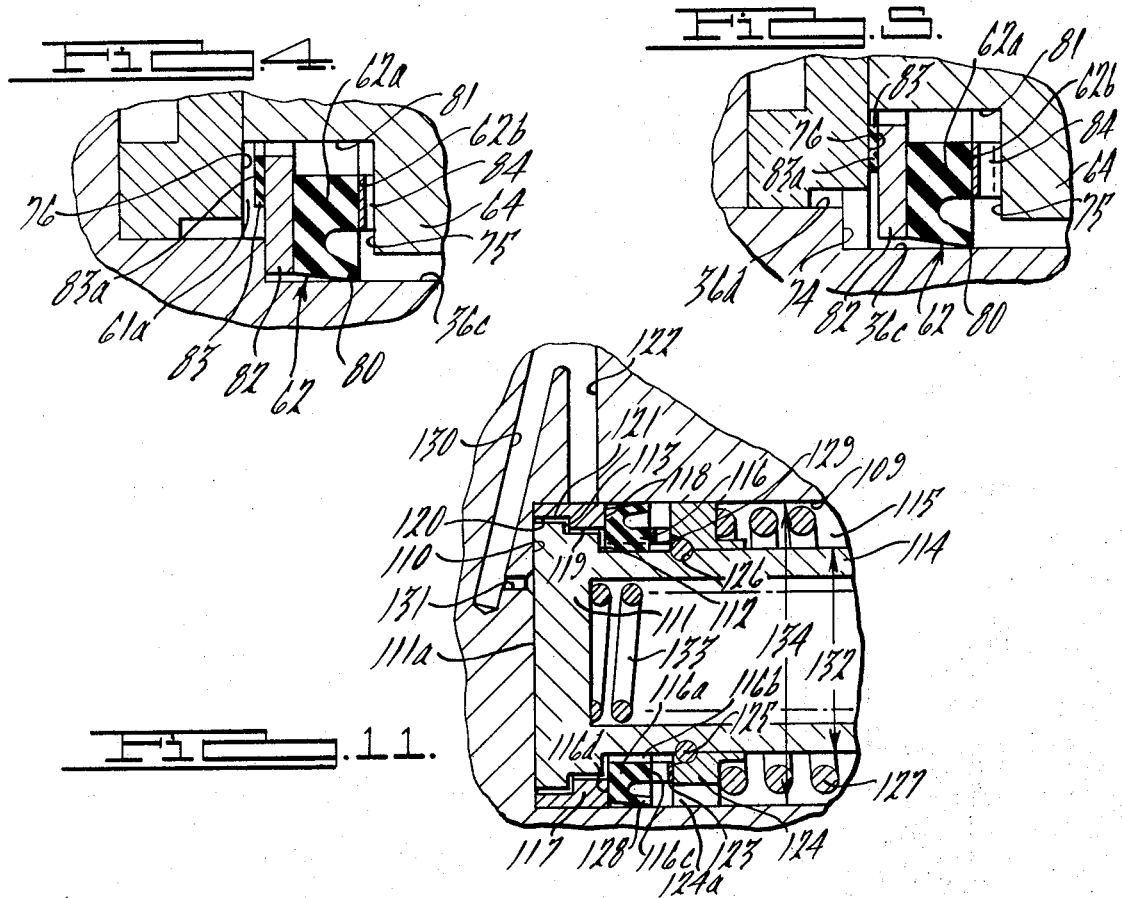
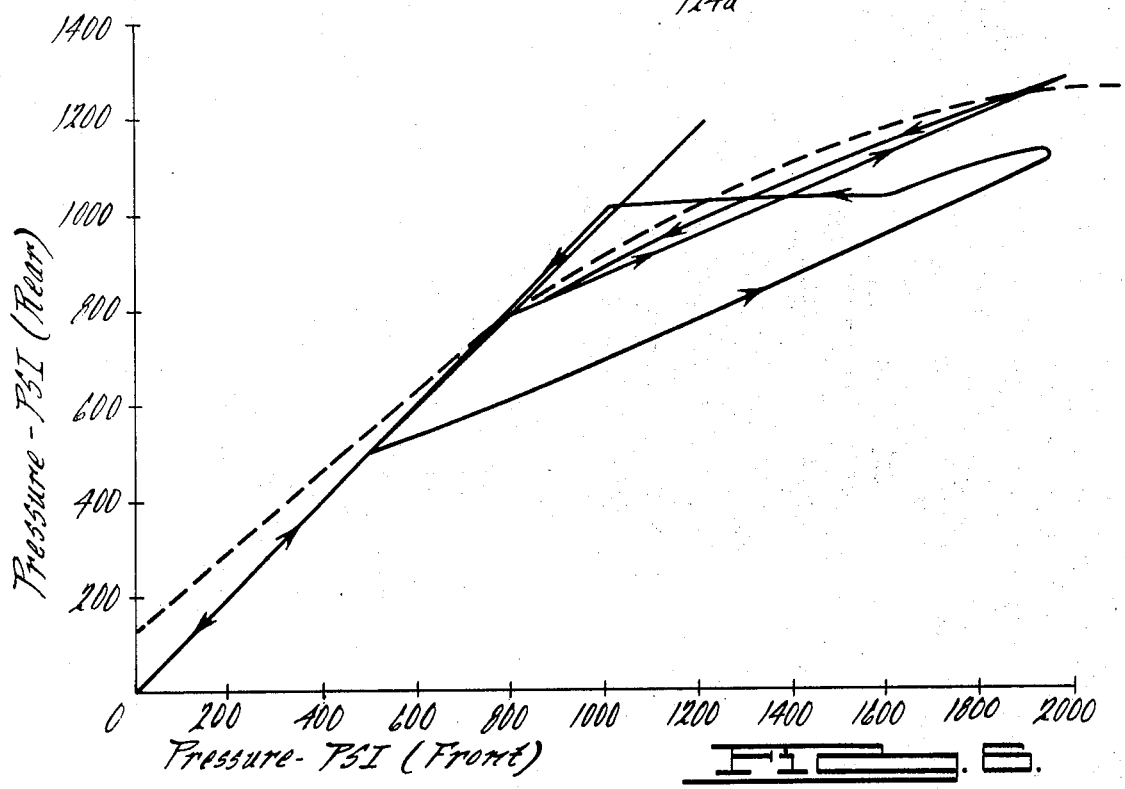

BRAKE SYSTEM PROPORTIONING VALVE

BACKGROUND OF THE INVENTION

There are many factors to consider in designing and developing a pressure regulating device to effect optimum brake balance; i.e., brake torque characteristics, brake effectiveness at any speed, and as well as, axle loading and weight shift. Compromises must be made for all these factors in order to obtain maximum deceleration and vehicle control under all conditions and such compromises are selected in the hope of achieving efficiency as high as possible in the utilization of available braking power. Braking efficiency is defined as the ratio between vehicle deceleration and road surface to tire traction when a brake stop is made without any wheel locking.

High efficiency is not easily obtainable. For a given wheel loading, 100 percent braking efficiency can only be obtained at one particular rate of vehicle deceleration and the efficiency falls off rapidly at other decelerations; the vehicle deceleration at which 100 percent efficiency occurs is established by the designer through selection of wheel cylinder sizes to obtain the desired brake balance. To improve braking efficiency over a broader range of deceleration, brake proportioning valves have been used by the prior art. The weight transfer from the rear wheels increases with increasing deceleration so some way is required to reduce the proportion of braking accomplished by the rear brakes as deceleration increases.

A simple method to reduce the braking by the rear brakes is to insert a pressure limiting or pressure reducing valve in the rear brake line. One such pressure reducing valve is shown in U.S. Pat. No. 3,423,936 and is particularly useful in braking systems having front disc brakes and rear drum brakes. At lower pressures, fluid passes from a master cylinder through the proportioning valve to the rear brakes and the same pressure exists in the rear brakes as in the master cylinder. At a predetermined or changeover pressure, this valve closes, isolating the line to the rear brakes; if the pressure in the master cylinder increases beyond this point, the valve opens to throttle fluid (an incremental cracking between slightly open and closed) to the rear brakes at a fraction of said increase in master cylinder pressure above the changeover pressure. In reducing the pressure, the valve is converting the excess pressure into heat by throttling. As the driver releases the brakes from a pressure greater than the changeover pressure, the valve does not fully open and only the front brake pressure drops with the drop-in brake pedal force; the rear brake pressure remains at its maximum rear brake pressure. When front brake pressure equals the changeover pressure, the front and rear brake pressures are equal and the proportioning valve opens. If the brake pedal force is further reduced, the front and rear brake pressure decrease together. If, however, the driver reapplies the brakes increasing pedal force, only the front brake pressure will increase until it reaches the proper fraction above the rear brake pressures; the front and rear brake pressures then increase together in proper proportion as the pedal force is further increased. Thus, there can be little improvement in efficiency when the driver attempts to modulate brake pressure utilizing this type of prior art valve. The deficiency in the use of such a valve is particularly evident when a curve is plotted representing rising input brake pressure as well as falling input brake pressure plotted against modulated output pressure. The difference between the rising and falling aspects represents hysteresis and departs rather heavily from an ideal curve representing an appropriate cycling relationship between front and rear braking effectiveness. The closer the regulating device can approach this ideal curve the more efficient and effective the braking system can be.

SUMMARY OF THE INVENTION

It is an object of this invention to provide a proportioning valve which increases the overall efficiency of the braking system more effectively than any known proportioning valve heretofore, and utilizes the available input energy in a manner to compensate more fully for linear deceleration effects between the rear and front wheels.

It is also an object of this invention to provide a proportioning valve incorporating a novel shiftable valve element, normally effective to permit the transmission of fluid pressure in a desired manner, and further operable to prevent the transmission of fluid pressure while shifting to provide pressure intensification of this invention to provide a proportioning valve of the above character which may be manufactured at a relatively low cost, is relatively simple in construction, and is reliable in use while facilitating miniaturization.

BRIEF SUMMARY OF THE DRAWINGS

FIG. 1 is a view of a brake system in part schematic and in part showing an enlarged central sectional view of a control valve forming a component of the system;

FIG. 2 is a plan view of the control valve of FIG. 1;

FIG. 3 is a side elevational view of the control valve of FIG. 1;

FIG. 4 is an enlarged fragmentary sectional view of a portion of the control valve illustrating one operative position;

FIG. 5 is another enlarged fragmentary sectional view of the same portion of the control valve as in FIG. 4 showing still another operative position;

FIGS. 6–10 represent various graphical illustrations depicting fluid pressure changes and pedal effort for purposes of showing proportioning effectiveness and system efficiency;

FIG. 11 is an enlarged sectional view of the forward portion of an alternative control valve having a simplified design.

DESCRIPTION

Figure 7:
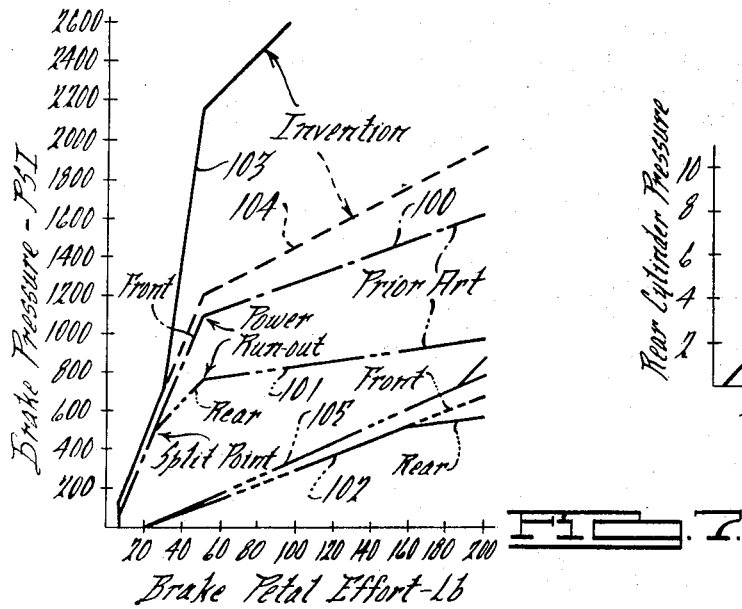

With particular reference to FIG. 1, there is shown a vehicle braking system having a master cylinder A (pressure generating means) for applying braking pressure to front wheel braking means B and rear wheel braking means C, each having differential mechanical capability and each being subject to differential linear deceleration effects. The differential mechanical capability results from the fact that the rear brakes are typically of the drum type having only one third the braking capacity of the front brakes, typically of the disc type. Differential linear deceleration effects refer to the fact that, under a stopping condition, the load of the vehicle shifts forward tilting the vehicle so that a greater downward force is applied to the front brakes while the rear end of the vehicle rises to apply less of a downward force to the rear brakes; both front and rear brakes are decelerated linearly at the same rate, but are subject to different effects from the linear deceleration. Suitable fluid communicating means D is employed to hydraulically interconnect the master cylinder and braking means B and C. A control valve V is operatively arranged in the fluid communicating means between the master cylinder and the braking means B and C and comprises a pressure balancing valve V-1 and a pressure proportioning valve V-2 which is particularly interposed in the circuit between the master cylinder and the front wheel braking means B so as to promote fluid intensification at a certain pressure level.

The master cylinder A can be typically of the split system type wherein independent braking pressures are developed respectively for the front brakes and rear brakes of the vehicle. Cylinder A is operated by a brake pedal 10 pivoted from the vehicle structure, as at 12. Fluid from the master cylinder comprises a first independent or primary fluid and is conducted via a conduit 14 to an inlet 16 of the control valve V. A second independent or secondary fluid is conducted via a conduit 18 to an inlet 20 disposed at the other end of the control valve V. Secondary fluid is conducted from the control valve to the rear wheel braking means C via conduit 22 connecting with outlet 24 of the control valve. Similarly, primary fluid is conveyed from the control valve by conduit 26, conducting fluid to the left front brake and conduit 28 conducting primary fluid to the right front brake, the conduits being connected respectively with outlets 30 and 32 of the control valve.

Control valve V has a rigid housing 34 provided with parallel aligned stepped bores 36 and 38; bore 36 has an enlarged diameter 36a for the major longitudinal extent of the bore and a minor diameter 36b. Bore 36 is effective to receive means cooperating to define the proportioning valve V-2. Stepped bore 38 is effective to cooperate and receive pressure balancing means V-1; bore 38 has stepped cylindrical walls 39, 40, 41 and 42, each progressively reducing in diametrical dimension respectively as 39a, 40a, 41a and 42a. A cross-channel 44 is provided in the housing connecting inlet 16 with the cylindrical wall 36d defining the minor diameter 36b of the bore 36 and the smallest cylindrical wall 42 of the stepped bore 38. A cross-channel 46 (into which a tube connector 46a may be inserted) communicates inlet 20 with the mouth 39 of stepped bore 38. A bisecting stepped bore 48 is provided having an enlarged portion 48a effective to receive an electrical switch to be discussed, and a reduced portion 48b communicating with the cylindrical wall 41 of bore 38.

In review of the above channels and bores, it should be noted that the bore 38 for receiving the pressure balancing valve has primary and secondary fluid pressures applied to opposite ends thereof, the primary fluid also bypassing to the bore 36 for conveyance through the proportioning valve V-2.

The pressure balancing valve V-1 has a centering piston 50 slidably received in the bore 38 with surfaces on opposed ends 51 and 52 subject respectively to primary and secondary fluid pressure. Piston 50 has a first cylindrical surface 53 effective to be slidably received in cylindrical wall 41 and is interrupted by an annular channel 53a for nestibly receiving an O-ring 54 providing a fluid seal therebetween. A righthand cylindrical piston portion 55 is disposed in cylindrical wall 40 spaced therefrom and having a diameter less than wall 53. Interrupting the cylindrical wall 53 is also a double tapered reduced necked portion 56 normally receiving element 57a in a neutral position of the switch 57. The effective pressure balancing surfaces at opposed ends of the piston can be equal in area so that under the normal mode of braking, without failure, the balancing piston will have a centered position as illustrated because primary and secondary pressures will be statically of identical values. However, dynamic conditions prevent the communicated primary and secondary pressures from being equal under all conditions (due to hydraulic line expansion, etc.). Therefore, the areas are designed at a slight differential requiring more than a 35 percent drop in a normal balanced pressure to achieve unbalancing. Upon failure of one of the pressures above 35 percent, the piston will be shifted to the right or left whereby the ends will stop against shoulders 58a or 58b, respectively, of bore 38.

The basic components of the proportioning valve comprise a piston assembly 60; walls defining bore 36 cooperating to define a fluid chamber 61 for the proportioning valve as well as a flow orifice 61a, and a shiftable element 62 for controlling flow in the orifice. In particularity, the piston assembly comprises a piston 63 having an annular flange 64 in slidable engagement with the interior cylindrical wall 36c of bore 36; the piston is resiliently urged to a first position as illustrated in FIG. 1 by a pair of coil springs 66 and 67 (coil spring 66 being piloted within a hollow extension of piston 63 and spring 67 is journaled about the exterior surface of the extension). Springs 66 and 67 each have one end working against a portion of cap 68 closing the open end of bore 36. Cap 63 is maintained in position by retainer ring 69 received in a suitable annular groove 70 adjacent the mouth of bore 36. The cap maintains sealing relationship with bore 36 by virtue of a typical gland 71 received in an annular space 72 in the outer surface 73 of the cap. A suitable metallic ring 59 is stationed at the inner end of the cap (piloted in bore 36 by tangs 59a on the ring) to contain a sealing element 79 (acting between cap 68 and the piston extension 63b) and to act as a bearing element between spring 67 and the cap 68.

For providing a staged operation of the proportioning valve, an annular shoulder 74 is defined as the transition surface between the stepped diameters 36a and 36b. A pair of axially spaced annular shoulders 75 and 76 are carried by the shiftable piston assembly. Shoulder 75 is defined as an annular surface on flange 64 facing end 63a of the piston. Shoulder 76 is provided by a surface on an annular plug 77 mounted in an annular recess at end 63a of the piston. End 63a also is adapted to engage the end 36e of bore 36 as a stop for a normally first biased position. For purposes of allowing fluid to exit conveniently from the left hand side of the plug and piston, a suitable centralized depression 78 is provided in end 63a for communicating with inlet 16.

Depending on the relative positioning of the three shoulders 75, 76 and 74, the shiftable element 62 is caused to provide first and second stages of pressure proportioning. The shiftable element 62 comprises an annular resilient body 62a carrying a conically shaped wiping flange 80 effective to maintain sealing engagement with the cylindrical wall of the fluid chamber under all conditions of operation. The inner periphery of the resilient body is dimensioned to be spaced from the cylindrical surface 81 of the piston. A flat metallic ring 82 having inner and outer radial dimensions slightly less than the radial dimensions of the resilient body is spaced from surface 81 by tongues 82a permitting to fluid to pass therebetween; the ring is bonded to side of the resilient body. In addition, a resilient closure ring 83 having a flat sealing surface 83a is bonded to the metallic ring 82 at an inner peripheral region thereof, and is effective to fluidly seal against shoulder 76 of the shiftable piston when brought thereagainst for prohibiting fluid communication between the inlet and outlet of the proportioning valve. However, to provide fluid communication in other positions of the piston 63 where there is no contact between the sealing surface of ring 83 and the piston shoulder 76, an annular convoluted spring 84 is employed between shoulder 75 of piston 63 and the annular face 62b of the resilient body 62a. The convoluted spring is effective to urge the entire assembly of the shiftable element 62 into contact with shoulder 74 of bore 36 while being urged in turn by piston 63 under the influence of springs 66 and 67. In this latter position, fluid is free to pass around the element 62 by flowing between convolutions of the spring 84 to maintain fluid communication with the outlet.

OPERATION

In operation, the first stage effect of the proportioning valve is achieved as a result of the appropriate selection of spring forces provided by the coiled springs 66 and 67 which normally urge the piston 63 to a first position (as in FIG. 1) with end 63a contacting the closed end of bore 36; the shiftable element 62 is in contact with shoulder 74 of the fluid chamber as urged by spring 84 acting between shoulder 75 of the piston and face 62b. Fluid is free to fully communicate between the inlet 16 and outlets 30 and 32. The piston 63 is piloted in bore 36 for considerable axial movement by sliding engagement of flange 64 with the bore and by sliding engagement of the hollow extension 63b in the interior cavity 68a of cap 68. The fit at end 63a is snug for proper piloting of the piston and to create a dashpot effect when the piston is returned to the left.

FIG. 4 illustrates the valve components and their relative position when the valve is at rest (no pressure) and during initial pressure buildup or first stage operation when inlet and outlet pressures are equal.

The first stage of operation of the proportioning valve is maintained until fluid pressure in inlet 16, working against a first surface area of piston 63 closely commensurate with the diameter 63c, is effective to overcome the force of the springs 66 and 67, which shall be hereinafter referred to as the split point; the second stage of operation then commences. Split point can be defined as that point at which the rear brake pressure (always substantially supply pressure) will be some value less than the front brake pressure, the ratio therebetween being predetermined. As the pressure in the inlet exceeds that of the springs 66 and 67, the piston will be urged by inlet pressure to shift progressively against the springs. At the shift point, closure of orifice 61a will take place; increase of inlet pressure thereafter will carry the shiftable element along with the piston resulting in a further increase in outlet pressure because the downstream fluid volume is trapped leading to the front brakes. A slight volumetric change in the downstream fluid promotes pressure intensification as a result of the fact that inlet pressure is now acting across a greater area (diameter 36a) than the resistance pressure of an annulus of fluid 86 defined between piston extension 63b and diameter 36a. If the cross-sectional area of the fluid annulus 86 is one-half of the area corresponding substantially to diameter 36a, than the front brake pressure will increase at twice the rate of rear brake pressure (which is at master cylinde pressure) above the split point. The volumetric displacement of fluid trapped downstream must be sufficient to allow raising the front brake pressure from the split point to the maximum front brake operating pressure; this requires considerable longitudinal travel of piston 63 not evident in prior art structures.

FIG. 5 illustrates the relative position of the valve components during second stage operation.

The proportioning valve would normally be mounted in a vertical position (with piston end 63a up) because the interior space of extension 63b is filled with air at atmospheric pressure. Some fluid in the extension 63b maintains this air content. A channel 87 is provided to allow escape of the fluid during a return motion of the piston upon relief of inlet pressure as mentioned earlier. Restriction 87a provides a dashpot effect during this operative movement. The dash pot effect provided by restriction 87a cushions the final movement of piston 63 when it returns to its at rest position and prevents an objectionable metallic sound when the piston portion 86 contacts the end 36e of the bore 36.

In modulation of braking effort, resulting when the brakes are released from a pressure greater than the changeover pressure, the shiftable piston will return toward its first position under the combined forces of the front brake pressure acting through the annulus area and the force of the springs 66 and 67 to displace brake fluid from the end 63a of the piston back into the inlet 16. At the moment primary brake pressure from the master cylinder decreases to the changeover pressure, the piston will stop against the end face of bore 36e and the shiftable element 62 will open as in its normal first stage operation. As the inlet pressure further continues to decrease as primary pressure further decreases, the front brake pressure will be the same pressure as master cylinder pressure. The front brake pressure vs. the master cylinder pressure relationship is essentially the same for decreasing pressures as it is for increasing pressures in both stages of proportioning (see FIG. 6), the only hysteresis being that caused by friction (principally seal friction). Therefore, improved braking efficiency and better modulation are obtained throughout the braking cycle since considerable energy is lost in the prior art pressure relationship (see FIG. 6).

In the second stage of operation, the output pressure or front brake pressure will be maintained within a certain tolerable limit for each specific combination of rear to front braking. This is more effectively brought out by the following data which was taken from testing one embodiment; the data shows various inlet pressures that are related to the range of outlet pressures (in p.s.i.) once the split point has been reached.

| INLET | OUTPUT |
| --- | --- |
| 100 | 100 |
| 200 (SPLIT) | 180 – 220 |
| 300 | 355 – 410 |
| 400 | 525 – 600 |
| 500 | 700 – 790 |
| 600 | 880 – 980 |
| 700 | 1050 – 1170 |
| 800 | 1230 – 1360 |
| 900 | 1400 – 1550 |
| 1000 | 1575 – 1740 |
| 1200 | 1925 – 2125 |

If all possible design criteria were taken into consideration as well as the environmental forces working on the braking system, an ideal curve plotting front vs. rear braking and pressures would present the goal to be achieved by proportioning. Master cylinder pressure increases at a rate which does not conform well with this ideal curve. Therefore, it is expedient to divide operations into stages to conform roughly to the ideal curve. In the embodiment of FIG. 1, a metering valve (such as disclosed in U.S. Pat. No. 3,586,384 incorporated herein by reference) can be employed downstream of the proportioning valve V-2 leading to the front brakes whereby fluid will not be communicated to the front brakes until a minimum pressure level is achieved such as 130 p.s.i.; the metering valve may thereafter function to communicate greater degrees of full pressure until approximately 300 p.s.i. or substantially the changeover pressure of valve V-2 is achieved. During modulation of the metering valve, full fluid pressure is communicated by proportioning valve V-2, that is both inlet and outlet pressure is the same (ratio 1:1) allowing the metering valve to work in conjunction with the difference in mechanical capability of the front and rear brakes to more closely approach the ideal curve during low master cylinder pressures.

During high master cyliner pressures any degree of pressure reduction to achieve proportioning wastes available energy and significantly affects efficiency. The use of pressure intensification by this invention obviates this. The ideal curve helps in making certain preliminary assumptions in designing a valve conforming with this invention. For example, in a braking system where the split point will normally be desirable at about 500 p.s.i., a useful proportioning ratio would be approximately 2.3:1 and a piston stroke of 0.6 inches or more is desirable to achieve the considerable increase in front brake pressure as a function of a trapped volume displacement of about 0.25 cubic inches. Withe these general practical criteria in mind, selection of suitable diametrical dimensions can be made; various pedal forces can be determined to correspond to the pressure relationship that will result from such selected fluid conditions to see if within reasonable expectations. Nulling the pedal force at critical points enables a mathematical selection to be made of the suitable springs determining the split point and thereby the rate of proportioning.

In place of a mathematical discussion, the resultant design data depicting quantitativily the advance over the prior is best shown in FIGS. 7–10 for a large vehicle embodiment. FIG. 7 compares the available braking pressure for a typical prior art proportioning valve in a heavy vehicle installation using pressure reduction and the available braking pressure using the proportioning valve of this invention dimensionally sized and installed in the same heavy vehicle braking system. Lines 100 and 101 represent respectively front and rear braking pressure changing with pedal effort for the prior art valve. The point labeled "split point" represents the brake changeover pressure at which proportioning begins. The point labeled "power run-out" represents the pressure at which a power assist, such as from vacuum manifold, can not amplify pressure. Lines 102 represent the function of the prior art valve when no power assist apparatus is used therewith and is dependent solely on manual effort; line 102 has a split point occurring at a much higher pedal effort (152 lbs.) than with power assist. Lines 103 and 104 represent respectively front and rear braking pressures for the invention valve when the system has power assist; considerable advantage is realized. Line 105 depicts pressure variation with no assist for the inventive valve.

Figure 10:
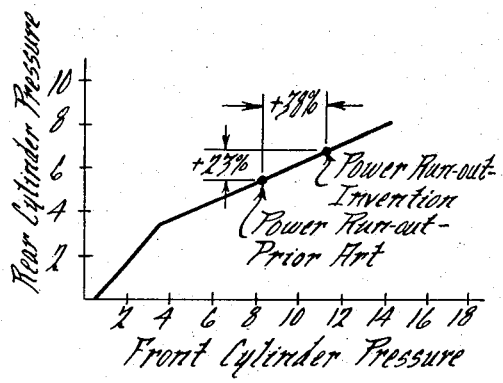
Figure 8:
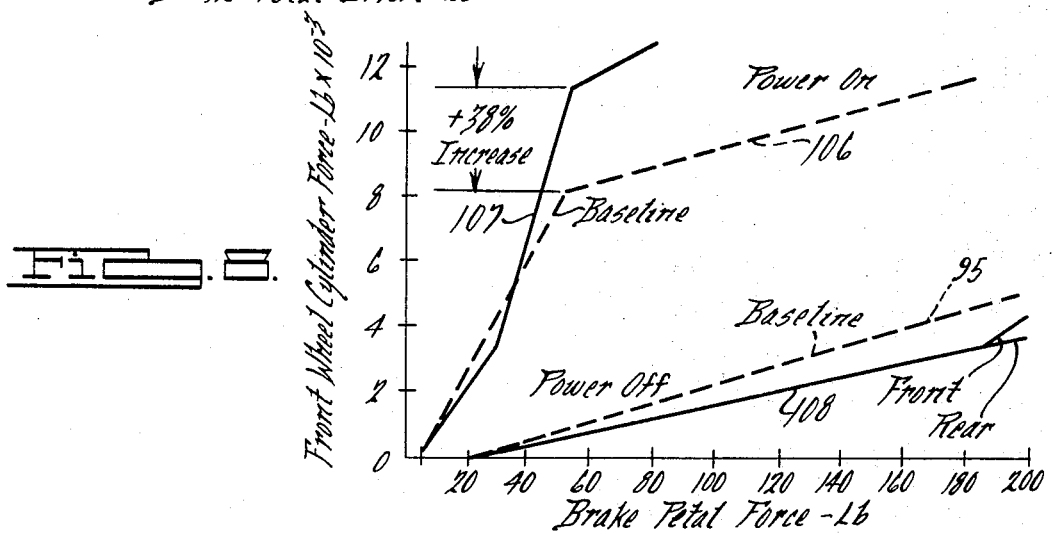
Figure 9:
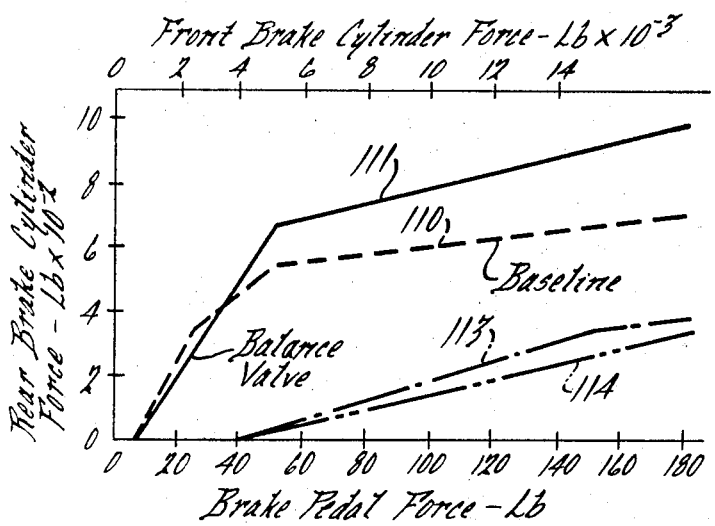

It is helpful to isolate the wheel cylinder pressure and plot the variation with pedal force; this reveals the manner in which energy is deployed more effectivey than total brake pressure. In FIG. 8, lines 106 represent front wheel brake cylinder pressure variation, called "baseline" for the prior art proportioning valve. It should be noted that line 107, depicting front wheel brake cylinder pressure variation for the inventive valve, conserves energy in the low ranges of pedal effort by being below the baseline and expands this energy by exceeding the baseline in higher ranges of pedal effort. The cylinder pressure difference at the power run-out point represents a 38 percent increase in available pressure over that of the prior art; this advantage is not present in the power off condition as illustrated by lines 95 for the prior art valve and 108 for the inventive valve. Similarly rear wheel braking cylinder pressure is plotted in FIG. 9; line 110 is prior art valve and line 111 is inventive valve. Lines 112 and 113 for prior art and invention, power off conditions. FIG. 10 directly plots front vs. rear cylinder pressure forces of the inventive valve more clearly showing the combined advantage. The braking system using prior art valve was designed for a second stage proportioning of 0.43:1 and had a efficiency of 43 percent. In contrast the inventive valve has an efficiency of about 98 percent, hysteresis is almost eliminated and modulation is improved. The gain can be used to increase the design of power run-out pressure points with requirement for increase in the booster of a power brake system. In a manual brake system, the designed pedal travel or pedal force can be reduced advantageously.

Turning now to FIG. 11, a simplified construction for the piston, bore and flow controller of the proportioning valve is illustrated, facilitating fabrication and assembly. Bore 109 is defined as a straight cylinder (devoid of an integral shoulder 74 as in the preferred embodiment) and having an end face 110 acting as a stop for piston 111 normally spring urged to the left as in the preferred embodiment. Piston 111 is not bi-partite, but has stepped shoulders 112 and 113 and a hollow extension 114 spaced from the bore wall to define a fluid annulus 115 one side of the flow controller 116 and is piloted at one end in an end cap (not shown) as previously. To complete the required surfaces to operate the flow controller, a short sleeve 117 is in bore 109 to the left of the controller and carries shoulder 118 (inner steps 119 and 120 compliment the steps on the piston to define a narrow annular passage 121 equivalent in area to the inlet area of inlet 122. Another shoulder 123 (disposed on the opposite side of the controller) is carried on a ring 124 piloted against bore 109 (by integral interrupted spacers 124a permitting fluid flow therepast) and having an inner surface fitted about extension 114 of the piston. Ring 124 is held in position by a stop wire 125 received in an annular groove 126 with a coiled spring 127 operating to urge the ring 124 against stop wire 125 and thereby urge the piston to the left.

The flow controller 116 is unitary of resilient material, having a wiping flange 128 effective to engage bore 109, a main body 116a having radially inwardly extending protrusions 116b (circumferentially spaced) to pilot the controller about the piston extension while permitting fluid flow therebetween. Convoluted spring 129 acts between an annular face 116c of the controller and shoulder 123 (moved by piston 111), similar to the preferred embodiment.

In operation, fluid pressure is freely communicated between inlet 122 and the outlets for the valve (not shown) when inlet pressure is below a predetermined split point. Free communication is provided by annular passage 121, circumferential spacing between projections 116b, spacing within the convolutions of spring 129, spacers 124a on ring 124 (which may be defined by slots producing the spacers), and finally to the fluid annulus 115 in communication with the outlets. As fluid inlet pressure begins to rise in inlet 122, the same pressure is communicated directly against the face 111a of piston 114 via passage 130 being in common communication with the inlet 122) and restricted passage 131. When the force of the fluid pressure acting across diameter 132 exceeds the combined force of springs 127 and 133, piston 111 moves to the right bringing shoulder 113 against step 119 and shoulder 112 against face 116d of the controller to block off fluid communication through the valve. Additional pressure increases in the inlet then act across diameter 134 of the bore 109 to move sleeve 117 and piston 111 together along the axis of bore 109, carrying controller 116 and ring 124 therealong. Trapped fluid in annulus 115 is increased in pressure in proportion to the rightward travel of piston 114. Decrease in inlet pressure operates the valve in reverse order, similar to the preferred embodiment.

I claim:

1. A vehicular braking system, comprising:
   a. means defining a fluid operated braking assembly having a graduated supply of pressure and having at least first and second braking portions, each portion having differential mechanical capability and each portion being subject to differential linear deceleration effects, and
   b. means controlling fluid communication to each of said first and second portions so as to proportion fluid pressure therebetween below a predetermined supply pressure in a manner compensating for said mechanical differential between said portions and to proportion fluid pressure at a fixed ratio between said portions when above said predetermined supply pressure by communicating an intensified fluid pressure to one of said portions to compensate for linear deceleration effects, said control means having pressure intensification means including a body of trapped fluid acted upon to communicate an intensified pressure to said one portion, said control means having a return channel for relieving pressure in said one portion upon a decrease in said supply pressure, said channel having a restriction therein to provide a delay in the return of fluid from said one portion whereby the control means is cushioned against abrupt action.

2. In a vehicle hydraulic brake system having a master cylinder and plurality of brake cylinders, a pressure regulating device adapted to be interposed between the master cylinder and at least one brake cylinder, said device including a housing having an inlet, an outlet, and a bore providing communication between said inlet and outlet, a pressure proportioning piston positioned in said bore and movable toward said outlet to generate a pressure at said outlet which is different from the inlet pressure acting on said piston, said piston having a protuberance, seal means surrounding said piston for providing a seal with said bore and adapted to be engaged by said protuberance as said piston moves toward said outlet, a flat wave spring effective to operate between another portion of said piston and said seal means to urge said seal means into engagement with the protuberance of said piston, said proportioning piston having a lesser effective area exposed to fluid at said outlet than an effective area exposed to fluid received from said inlet when said seal means is in engagement with said piston whereby said piston will generate a higher pressure at said outlet than the pressure of the fluid received from said inlet, and means restricting the return flow of fluid to said inlet from said proportioning piston upon relief of the inlet pressure.

* * * * *